(12) United States Patent
Atias et al.

(10) Patent No.: US 12,230,968 B2
(45) Date of Patent: Feb. 18, 2025

(54) POWER SYSTEM INCLUDING A POWER STORAGE

(71) Applicant: Solaredge Technologies Ltd., Herzeliya (IL)

(72) Inventors: Matan Atias, Tel Aviv (IL); Ziv Moscona, Tel Aviv (IL); Ran Zorea, Be'er Yaakov (IL); Liron Har-Shai, Tel Mond (IL)

(73) Assignee: Solaredge Technologies Ltd., Herzeliya (IL)

( * ) Notice: Subject to any disclaimer, the term of this patent is extended or adjusted under 35 U.S.C. 154(b) by 77 days.

(21) Appl. No.: 18/154,232

(22) Filed: Jan. 13, 2023

(65) Prior Publication Data

US 2023/0231389 A1    Jul. 20, 2023

Related U.S. Application Data

(60) Provisional application No. 63/299,477, filed on Jan. 14, 2022.

(51) Int. Cl.
*H02J 3/38* (2006.01)
*H02M 3/158* (2006.01)

(52) U.S. Cl.
CPC ............. *H02J 3/381* (2013.01); *H02M 3/158* (2013.01); *H02J 2207/50* (2020.01); *H02J 2300/24* (2020.01); *H02J 2300/28* (2020.01); *H02J 2300/30* (2020.01)

(58) Field of Classification Search
CPC .... H02J 3/381; H02J 2207/50; H02J 2300/24; H02J 2300/28; H02J 2300/30; H02J 9/062; H02J 13/00004; H02J 13/00009; H02J 2207/10; H02J 2300/20; H02M 3/158
See application file for complete search history.

(56) References Cited

U.S. PATENT DOCUMENTS

| | | |
|---|---|---|
| 4,695,785 A | 9/1987 | Mieth et al. |
| 5,621,300 A | 4/1997 | Sato et al. |
| 2009/0236916 A1 | 9/2009 | Nishimura |
| 2015/0069950 A1 | 3/2015 | Ishibashi et al. |
| 2017/0085093 A1* | 3/2017 | Arditi ........................ H02J 7/35 |
| 2018/0037121 A1* | 2/2018 | Narla ....................... B60L 55/00 |
| 2021/0376790 A1 | 12/2021 | Chen et al. |

OTHER PUBLICATIONS

Jun. 20, 2023—European Search Report—EP App. No. 23151762.4.

* cited by examiner

*Primary Examiner* — Lincoln D Donovan
*Assistant Examiner* — Alex W Lam
(74) *Attorney, Agent, or Firm* — Banner & Witcoff, Ltd.

(57) ABSTRACT

A power system may comprise a power system controller and a power storage. The power system controller may comprise a first pair of power terminals, a second pair of power terminals, at least one switch, and a central controller coupled to the at least one switch. The power storage may comprise storage power terminals connected to the first pair of power terminals. The second pair of power terminals may be coupled to a power source. The power system controller may be configured to control the switch to connect and disconnect the second pair of power terminals. The power system controller may be configured to receive power from the power storage during a process of connecting and disconnecting the second pair of power terminals.

17 Claims, 8 Drawing Sheets

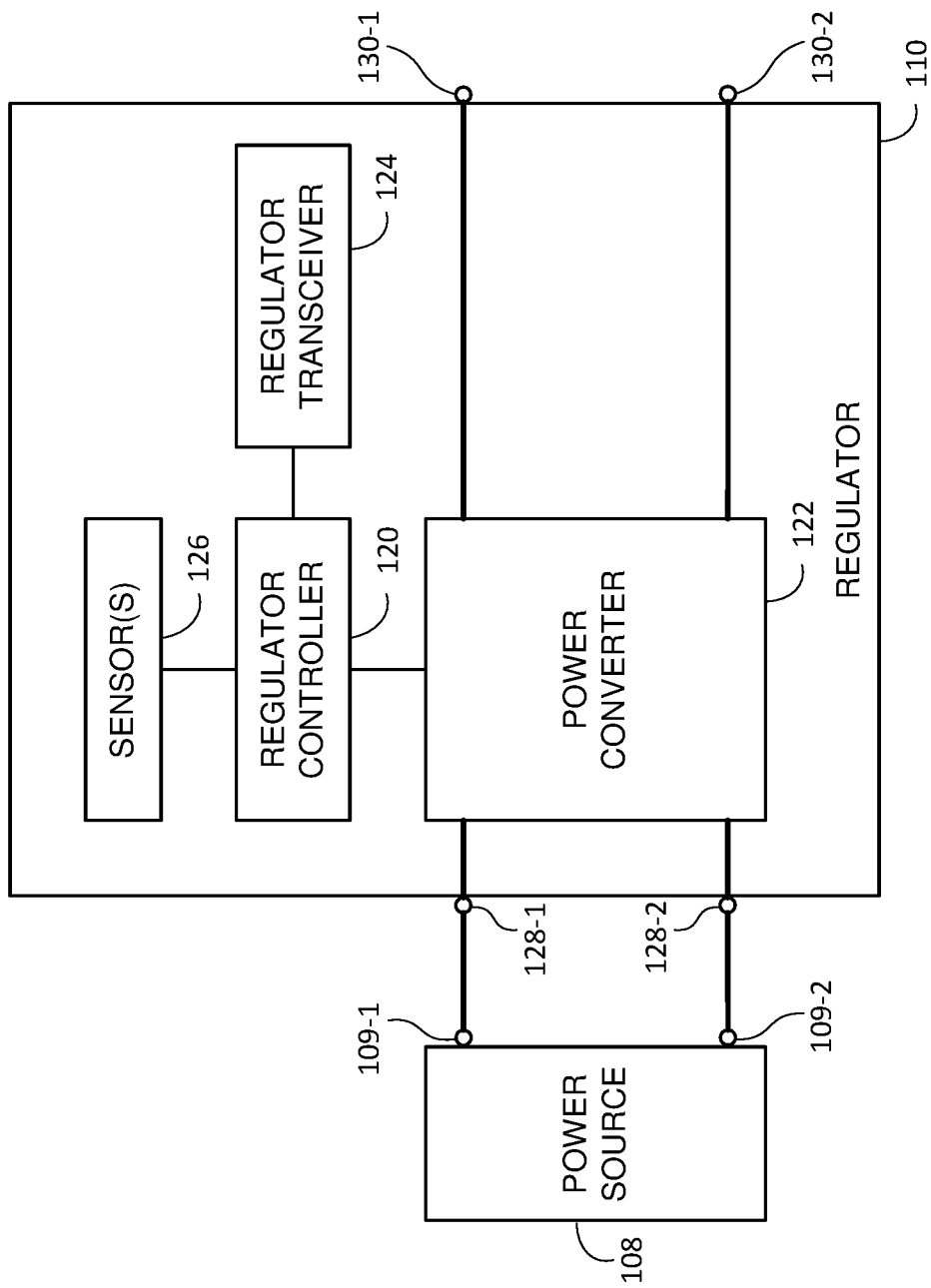

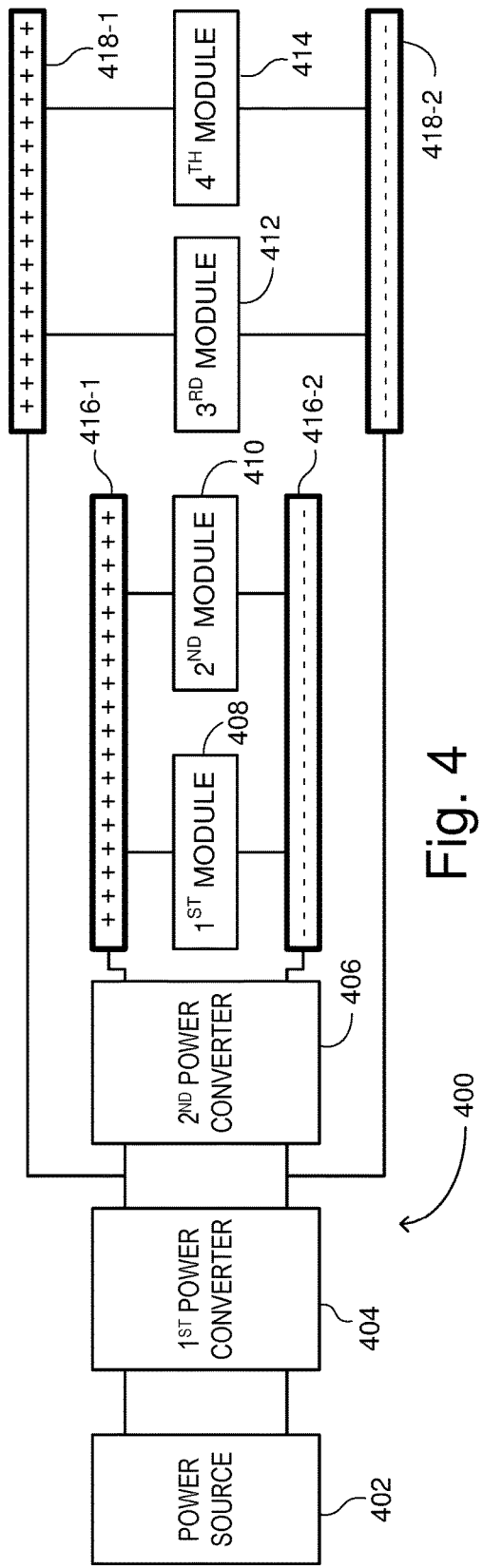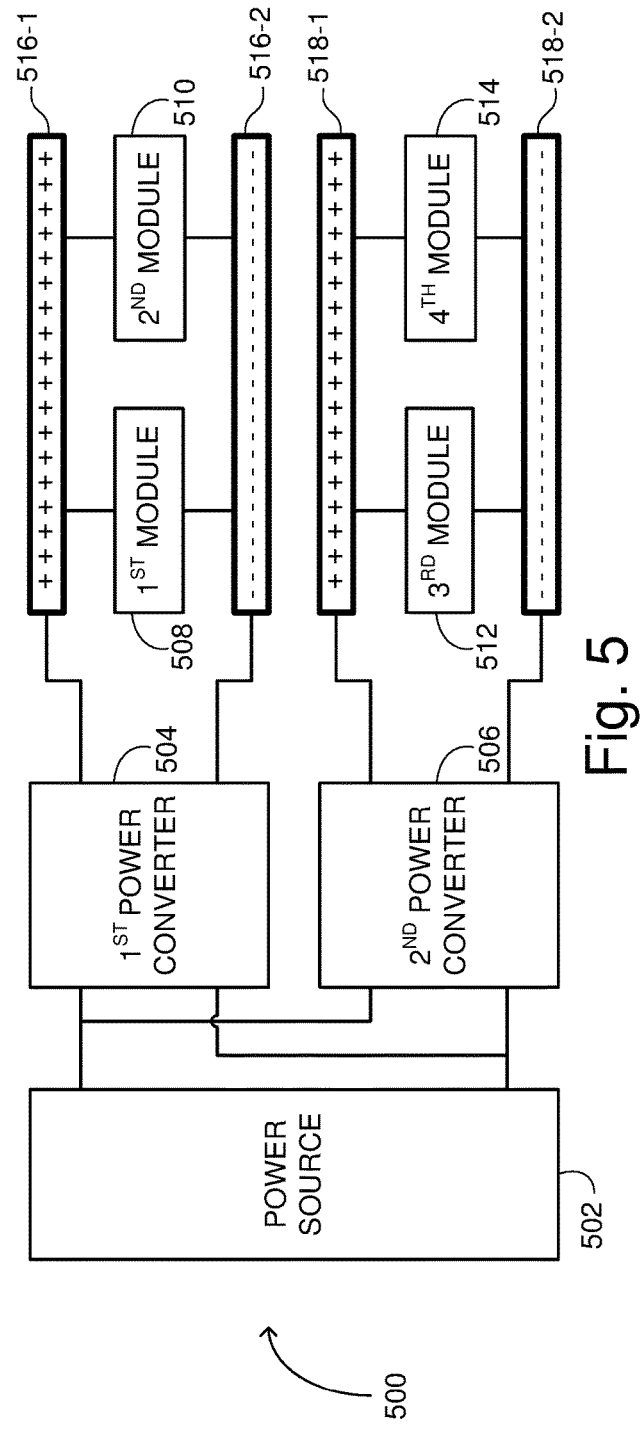

POWER SYSTEM INCLUDING A POWER STORAGE

CROSS-REFERENCE TO RELATED APPLICATIONS

The application claims priority to U.S. Provisional Application No. 63/299,477 filed Jan. 14, 2022. The entire disclosure of the foregoing application is incorporated by reference in its entirety.

FIELD OF THE APPLICATION

The application relates generally to power systems. More specifically, the application provides systems, methods, and devices for commissioning and controlling a power system controller in a power system.

BACKGROUND

A power system may comprise a plurality of power sources (e.g., solar panels, wind turbines, fuel cells, flywheels, supercapacitors, photovoltaic modules, power generators). Each of the plurality of power sources may be connected to a respective power regulator. A group of power regulators may be connected in series or in parallel forming a string of power regulators. The string of power regulators may be connected to a power system controller (e.g., an inverter or a combiner) over power lines. For example, if the power system controller is an inverter converting Direct Current (DC) power from the power lines to Alternating Current (AC) power, the power system controller may employ the DC power from the power lines for the operation of the power system controller (e.g., to provide power for the operation of the various modules of the power system controller). In a power system comprising power regulators and a power system controller, the power system controller and the power regulators may communicate with each other. A power system may include power storage. The power storage may be employed, for example, for backup power (e.g., during a power outage of a power source such as a grid, or when the power source does not produce power) or peak power shaving. The power storage may be connected to the power system controller via the same power lines connecting the power regulators to the power system controller.

A power system may experience a short circuit or a disconnect in the power lines that connect the power regulators to the power system controller. Such a short circuit or disconnect may be by design (e.g., for communications purposes, testing purposes) or due to a fault. When such a short circuit or disconnect occurs, a power system controller may not have the power required for performing operations.

BRIEF SUMMARY

The following is a simplified summary of some of the application for illustrative purposes only. This summary is not an extensive overview and is not intended to identify key or critical elements of the present disclosure. This summary is not intended to limit or constrain the present disclosure.

A power system may comprise a power system controller and a power storage. The power system controller (e.g., a power system central controller) may comprise a first pair of power terminals, a second pair of power terminals, at least one switch coupled between the second pair of power terminals, and a central controller coupled to the at least one switch. The power storage may comprise storage power terminals connected to the first pair of power terminals of the power system controller. The second pair of power terminals may be coupled to a power source. The power system controller may be configured to control the switch to connect and/or disconnect the second pair of power terminals to and from each other. The power storage may be configured to provide power to the power system controller, and/or store power received from the power system controller. The power system controller may be configured to employ (e.g., receive, use) power from the power storage at least during the connection and the disconnection of the second pair of power terminals (e.g., during a communications set-up process or measurement of system parameters, during a process of connecting and disconnecting the second pair of power terminals).

A power system may comprise a power system controller, a plurality of power regulators, and a power storage. The power system may comprise a first pair of power terminals, a second pair of power terminals, and a central transceiver. Each power regulator of the plurality of power regulators may comprise input terminals coupled to a respective power source, output terminals, and a regulator transceiver. The power storage may comprise storage power terminals connected to the first pair of power terminals of the power system controller. The output terminals of each power regulator may be configured to be coupled in a string. The string may be connected to the second pair of power terminals of the power system controller. The central transceiver and the power regulator(s) may be configured to communicate with each other over the power lines. The power storage may be configured to provide power to the power system controller or store power received from the power system controller. The power system controller may be configured to employ power from the power storage at least for setting up communications with the plurality of power regulators over the power lines. For example, if setting up communications with the plurality of power regulators over the power lines comprises shorting and opening the second pair of power terminals, the power system controller may not be able to employ power from the string during the setting up of communications.

A method may comprise receiving, by a power system controller, power from a power storage. The method may further comprise converting, by a first power converter, power from the power storage. The method may further comprise based on the received power from the power storage, pairing the power system controller with at least one power regulator.

A power system controller may comprise first pair of power terminals, second pair of power terminals, and a central transceiver. Input terminals of a first power converter may be coupled to the first pair of power terminals of the power system controller. The first power converter may be configured to convert power from a power storage, and to provide at least the power employed for setting up communications with a plurality of power regulators.

A method may comprise converting, by a power converter, power from a power storage for operating a controller in a power system controller. The method may further comprise connecting and disconnecting power input terminals of the power system controller based on the converted power. For example, connecting and disconnecting power input terminals of the power system controller may be employed for signaling power regulators connected to the power input terminals of the power system controller. For example, during a communication set-up process between the power system controller and the power regulators, the power system controller may signal to the power regulators information indicating an identification (ID) of the power system controller, or at least one communication frequency (e.g., for communications between the power system controller and the power regulators).

BRIEF DESCRIPTION OF THE DRAWINGS

A more complete understanding of the present application and the advantages thereof may be acquired by referring to the following description in consideration of the accompanying drawings, in which like reference numbers indicate like features, and wherein:

FIGS. 1A, 1B, and 1C show an example of a power system;

FIG. 4 shows an example of a power supply system;

FIG. 5 shows an example of a power supply system;

DETAILED DESCRIPTION

In the following description of the various embodiments, reference is made to the accompanying drawings, which form a part hereof, and in which is shown by way of illustration various embodiments in which the application may be practiced. It is to be understood that other embodiments may be utilized and structural and functional modifications may be made without departing from the scope of the present application.

A power system may comprise a plurality of power sources. Each of the plurality of power sources may be connected to a respective power regulator. The power regulators (e.g., groups of power regulators) may be connected in series or in parallel forming a string of power regulators. The string of power regulators may be connected to a power system controller (e.g., a power system central controller, an inverter, a combiner) over power lines. The power system controller and the power regulators may communicate with each other over the power lines. The power system may comprise power storage connected to the power system controller at the same electrical node of the power lines connecting the string of power regulators to the power system controller. In some examples, the power system controller may not be able to employ (e.g., use) power from the string or strings of power regulators for the operation of the power system controller (e.g., for powering the circuits of the power system controller). For example, the power lines connecting the string of power regulators to the power system controller may be short circuited (e.g., for setting up communications, or for testing). As another example, the power lines connecting the sting of power regulators to the power system controller may be disconnected. As another example, the power source may not produce power (e.g., during the night if the power source is a photovoltaic power source, or when there is no wind if the power source is a wind turbine). For the power system controller to operate during a short circuit of the power lines connecting the string of power regulators to the power system controller, the power system controller may employ power from the power storage (e.g., the power storage connected to the power system controller).

A power system may operate in a backup mode. For example, during a power outage of a power source (e.g., the grid), or if the power source does not produce power, the power system may operate in a backup mode. In the backup mode, the power system may employ power from the power storage to provide power to the user premise and for the operation of the power system controller.

Figure 1A:
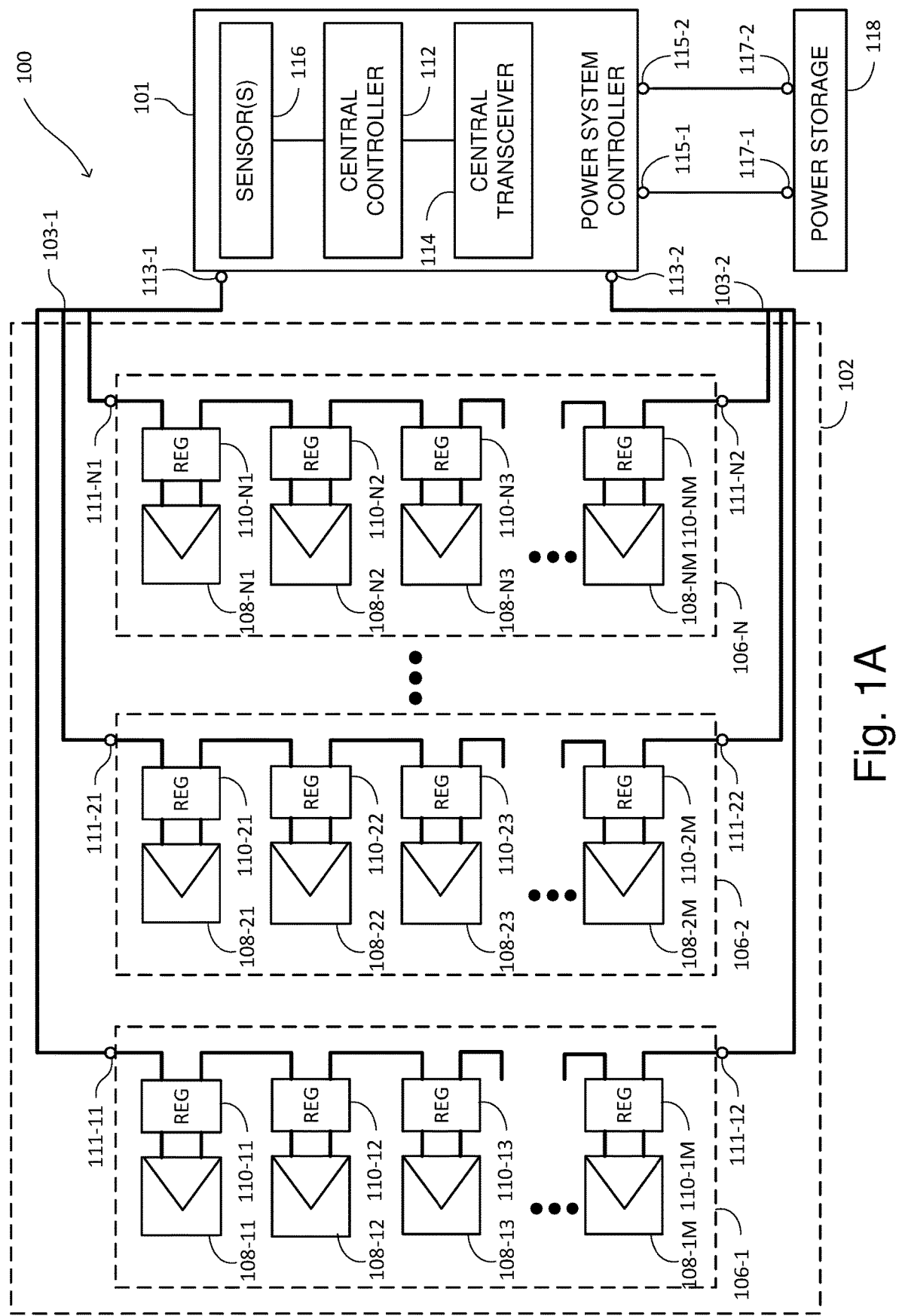
Figure 1B:
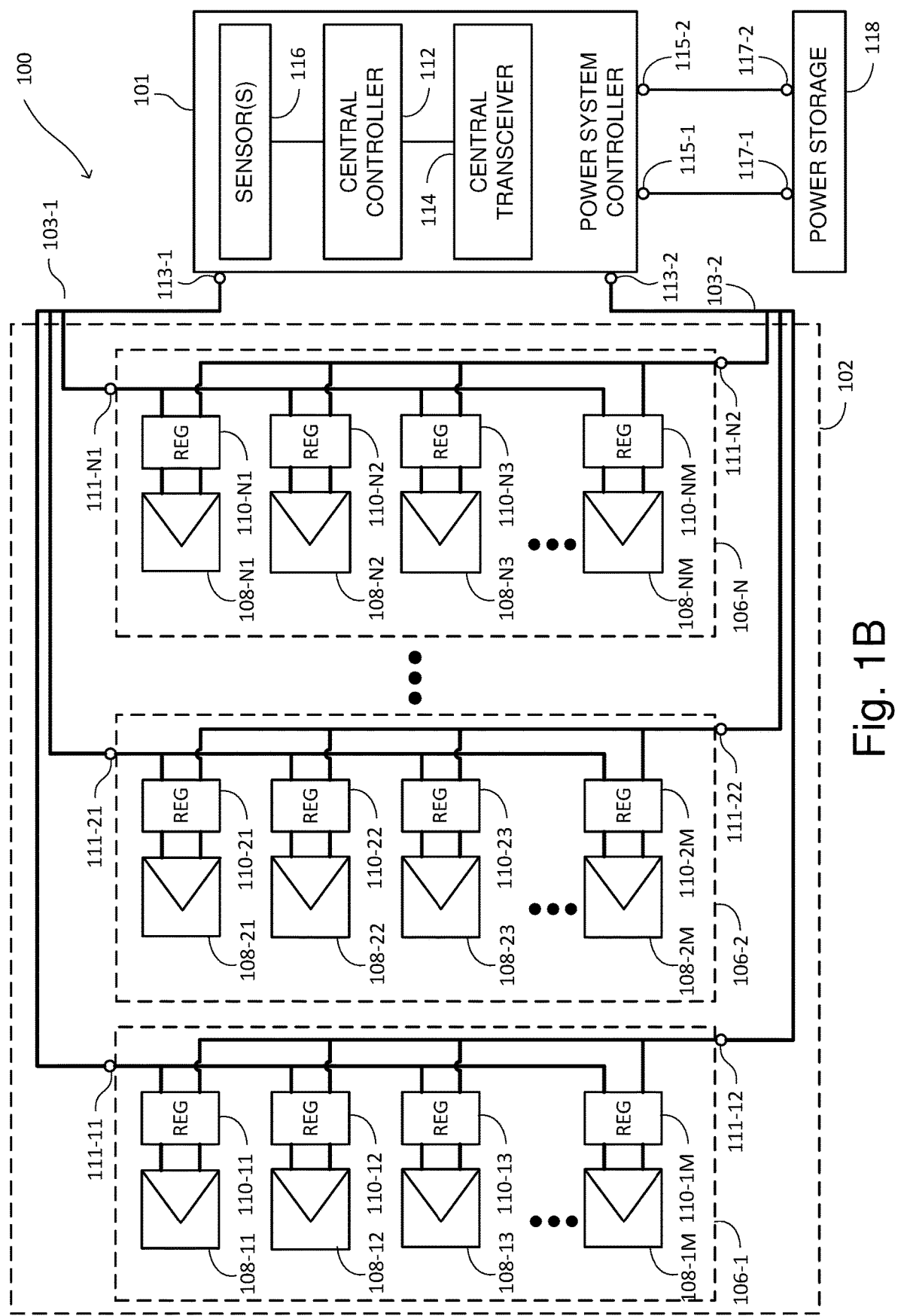

FIGS. 1A, 1B, and 1C show examples of a power system 100, in which power may be harvested. The power system 100 may comprise a plurality of power sources 108, a plurality of power regulators 110 (abbreviated "REG" in FIGS. 1A and 1B), a power system controller 101 (e.g., a power system central controller), and a power storage 118. Each power source 108 (e.g., 108-11, . . . , 108-1M, 108-21, . . . , 108-2M, 108-N1, . . . , 108-NM) may be connected to the input terminals of a corresponding power regulator 110 (e.g., 110-11, . . . , 110-1M, 110-21, . . . , 110-2M, 110-N1, . . . , 110-NM). The plurality of power sources 108 and corresponding power regulators 110 may be arranged in an array of power sources 102. The array of power sources 102 may comprise one or more strings 106 (e.g., strings 106-1, 106-2, . . . , 106-N).

A string 106 may comprise a group of serially connected power regulators 110. For example, as shown in FIG. 1A, the string 106-1 may comprise a group of serially connected power regulators 110-11, 110-12, 110-13, . . . , 110-1M. Similarly, in the example of FIG. 1A, the string 106-2 may comprise a group of serially connected power regulators 110-21, 110-22, 110-23, . . . , 110-2M, and the string 106-N may comprise a group of serially connected power regulators 110-N1, 110-N2, 110-N3, . . . , 110-NM. A string 106 may comprise a group of parallel connected power regulators 110. For example, as shown in FIG. 1B, the string 106-1 may comprise a group of parallel connected power regulators 110-11, 110-12, 110-13, . . . , 110-1M. Similarly, in the example of FIG. 1B, the string 106-2 may comprise a group of parallel connected power regulators 110-21, 110-22, 110-23, . . . , 110-2M, and the string 106-N may comprise a group of parallel connected power regulators 110-N1, 110-N2, 110-N3, . . . , 110-NM. In the examples of FIGS. 1A and 1B, the strings 106-1, 106-2, . . . , 106-N may be connected in parallel by connecting the output terminals 111-11, 111-21, . . . , 111-N1 of the strings 106-1, 106-2, . . . , 106-N respectively, with power input terminals 113-1 of the power system controller 101, and by connecting output terminals 111-12, 111-22 and 111-N2 of the strings 106-1, 106-2, . . . , 106-N respectively, with power input terminals 113-2 of the power system controller 101. The strings (e.g., the string 106-1, 106-2, . . . , string 106-N) may also be connected in series.

The power system controller 101 may comprise a central controller 112, a central transceiver 114, sensor(s) 116, and the power input terminals 113-1 and 113-2. The power system controller 101 may comprise power storage terminals 115-1 and 115-2. The power storage terminals 115-1 and 115-2 may be different from the power input terminals 113-1 and 113-2. The central controller 112 may be connected to the central transceiver 114. The central controller 112 may be connected to the sensor(s) 116. The array of the power sources 102 may be connected to the power system controller 101 by connecting the output terminals 111 of the strings 106 (e.g., the output terminals 111-11, 111-12, . . . , 111-N1, 111-N2) with the power input terminals 113-1 and 113-2 of the power system controller 101. For example, the power input terminal 113-1 may be connected to the output terminals 111-11, 111-21, . . . , 111-N1 of the strings 106-1, 106-2, . . . , 106-N respectively by power lines 103-1. The power input terminal 113-2 may be connected to the output terminals 111-12, 111-22, . . . , 111-N2 of the strings 106-1, 106-2, ..., 106-N respectively by power lines 103-2. The power system controller 101 may be connected to the power storage 118 by connecting power terminals 117-1 and 117-2 of power storage 118 to the power storage terminals 115-1 and 115-2 of the power system controller 101. For example, the power storage terminal 115-1 may be connected to the power terminal 117-1, and the power storage terminal 115-2 may be connected to the power terminal 117-2. The sensor (s) 116 may be one or more voltage sensors, one or more current sensors, and/or one or more temperature sensors configured to measure various characteristics of the power system controller 101.

Referring to FIG. 1C, each power regulator 110 may comprise a regulator controller 120, a power converter 122, and a regulator transceiver 124. The power regulator 110 may comprise sensors(s) 126. The regulator controller 120 may be connected to the power converter 122. The regulator controller 120 may be connected to the regulator transceiver 124. The regulator controller 120 may be connected to the sensor(s) 126. The power converter 122 may be a DC to DC (DC-DC) converter, a DC to AC (DC-AC) converter, an AC to AC (AC-AC) converter, an AC to DC (AC-DC) converter, and/or any combination thereof. The power regulator 110 may be connected to output terminals 109-1 and 109-2 of the power source 108 via input terminals 128-1 and 128-2. The power converter 122 may be configured to receive power from the input terminals 128-1 and 128-2, and to provide power at the output terminals 130-1 and 130-2 of the power regulator 110. For example, the power converter 122 may convert power based on a Pulse Width Modulation (PWM) signal from the regulator controller 120. The sensor(s) 126 may be one or more voltage sensors, one or more current sensors, and/or one or more temperature sensors configured to measure various characteristics of the power regulator 110.

In the power system 100, the power system controller 101 may communicate with the power regulators 110. For example, the power system controller 101 may send signals relating to various parameters (e.g., power production parameters) to the power regulators 110. One or more of the power regulators 110 may send a signal related to at least operating parameters of the power regulators (e.g., output voltage, output current, or temperature). The regulator transceiver 124 and the central transceiver 114 may communicate with each other based on a transmission protocol defining transmission frequencies, a modulation scheme (e.g., amplitude shift keying (ASK), frequency shift keying (FSK), quadrature phase shift keying (QPSK), quadrature amplitude modulation (QAM)), multiple access schemes (e.g., time division multiple access (TDMA), time division multiple access (FDMA), code division multiple access (CDMA), carrier sense multiple access (CSMA), Aloha), and/or one or more encoding/decoding schemes (e.g., non-return to zero (NRZ), Manchester coding, block coding). The communication between the regulator transceiver 124 and the central transceiver 114 may be over various media such as wireless, power lines (e.g., the power lines 103-1 and 103-2), telephone lines, internet lines, and/or dedicated lines. The communication between the regulator transceiver 124 and the central transceiver 114 may be in a variety of communication protocols such as ZigBee™, ZigBee home automation, Wi-Fi, Bluetooth™, x10, Ethernet, various cellular protocols, and/or power lines communication (PLC). For example, the regulator transceiver 124 and the central transceiver 114 may communicate with each other by modulating a high frequency signal (e.g. at a frequency up to 1 kHz, 10 kHz, 100 kHz, 1 MHz, or higher) over the power lines. PLC may use the existing wires for power as network cables for communication. The central transceiver 114 may send one or more signals (e.g., one or more broadcast, multicast, or unicast signals) to all the power regulators 110, a subset of the power regulators 110, or a selected one of the power regulators 110.

Each of the plurality of power sources 108 may be configured to generate electrical power at the output terminals (e.g., the output terminals 109-1 and 109-2). A power source 108 may comprise a DC power source such as a photovoltaic module, a battery (e.g., a lithium ion battery, lead-acid batteries, solid-state batteries, a redox flow battery), a capacitor, or a fuel cell. A power source 108 may comprise an AC power source, such as a wind turbine, or a fuel powered generator configured to generate AC power at the output terminals. A power regulator 110 may receive power from a respective power source 108, and regulate the power from the corresponding power source 108. For example, a power regulator 110 may be configured to perform Maximum Power Point Tracking (MPPT) of the power at input terminals (e.g., the input terminals 128-1 and 128-2). The power regulator 110 may be configured to perform MPPT of the power at output terminals 130-1 and 130-2.

The power regulators 110 may receive the power employed for the operation of power regulator 110, from the corresponding power sources 108. The power regulators 110 may provide power at the output terminals 130-1 and 130-2, and on the power lines 103-1 and 103-2. The power system controller 101 may receive the power used for the operation of the power system controller 101 from the power lines 103-1 and 103-2.

Based on the communications between the power system controller 101 and the power regulators 110 being set up (e.g., paired), the power system controller 101 may send (e.g., periodically or on demand from the power regulators 110) one or more signals relating to power production of the power regulators 110 to one or more of the power regulators 110. The signals relating to the power production of the power regulators 110 may comprise indications and/or information relating to increasing, decreasing, or maintaining an output characteristic (e.g., output power, output voltage, or output current) of the power regulators 110. In some examples, the power regulators 110 may output power at a safe voltage (e.g., less than 10 Volts), a safe current (e.g., less than 1 Ampere, less than 0.1 Ampere, less than 0.01 Ampere), or at both a safe voltage and a safe current. The power regulators 110 may change (e.g., update) the output characteristic based on receiving one or more signals relating to the power production from the power system controller 101. Based on the communications between the power system controller 101 and the power regulators 110 being set-up, the power regulator 110 may send (e.g., transmit) telemetry signals to the power system controller 101 (e.g., periodically or on demand from the power system controller 101). The telemetry signals may comprise information relating to the power produced or output by a power regulator 110 (e.g., output power, output voltage, output current, temperature, or duty cycle).

Prior to sending signals relating to power production and telemetry signals, communications between the power system controller 101 and the power regulators 110 may be set up. Setting up communications between the power system controller 101 and the power regulators 110 may be referred to herein as "pairing." Pairing may comprise the power system controller 101 sending a pairing signal relating to an identifier (e.g., ID number, an identifying code), or to a communication channel or channels (e.g., frequencies, time slots, codes or any combination thereof), or to both. Thus, the power regulators 110 "know" with which power system controller to communicate. Pairing may take place at the time of manufacture of the components of the power system 100, during installation of the power system 100, during the operation of the power system 100, or after an upgrade or modification to the power system 100. Once pairing is completed, the power system controller 101 and the one or more of the power regulators 110 are determined to be "paired."

In some cases, communications between the power regulators 110 and the power system controller 101 may be prone to crosstalk interference from other systems similar to the power system 100. If such crosstalk interference occurs, the power regulators 110 may receive signals from a power system controller of another system or systems. To reduce the probability of the power regulators 110 receiving signals from a power system controller of another system or systems, pairing between the power system controller 101 and the power regulators 110 may be based on the power system controller 101 shorting the power input terminals 113-1 and 113-2, and consequently shorting the power lines 103-1 and 103-2. For example, a "0" volt may be determined (e.g., measured, sent) when the power system controller 101 shorts the power input terminals 113-1 and 113-2. The power regulators 110 may measure zero volts at output terminals 130-1 and 130-2. A "1" volt may be determined (e.g., measured, sent) by the power system controller 101 leaving the power input terminals 113-1 and 113-2 open. The power regulators 110 may measure the safe voltage at the output terminals 130-1 and 130-2 and determine if a "1" or a "0" is sent. The frequency of transmission during pairing may be low (e.g., less than 100 Hertz), such that crosstalk interference is sufficiently reduced.

As used herein, the term "short" refers to dead shorts (0 ohms), or shunting with a low valued resistive element (e.g., <1 ohm, <2 ohm, <3 ohm, the ON resistance of a power MOSFET, etc.). Further, when referring to the power system controller 101 shorting or short circuiting the power input terminals or output of a power source (e.g., an array of PV panels), the power system controller 101 may additionally or alternatively reduce (e.g., regulate) the voltage or power coming from the power source such that the voltage or power is insufficient to power the power system controller 101. For example, the positive and negative terminals of the power source 108 may be shunted below a threshold voltage (e.g., 1V), or shunted with a low valued resistive element (e.g., <1 ohm, a power MOSFET turned ON, etc.). Thus, the power system controller 101 may send a pairing signal relating to an identifier, to a communication channel or channels, or both, to the power regulators 110 connected to the power system controller 101. The power regulators 110 connected to the power system controller 101 may receive the pairing signal with little or no crosstalk interference.

If pairing is achieved by shorting and/or opening the power input terminals 113-1 and 113-2, the power system controller 101 may not receive power from the power input terminals 113-1 and 113-2, and may require a power source to provide power for the operation of the power system controller 101 during the pairing. To that end, the power system controller may employ power from the power storage 118. The power system controller 101 may use power from the power storage 118 during the pairing process. For example, the power storage 118 may store previously stored energy (e.g., from the previous charging cycle, or during the manufacturing process if, for example, the power storage 118 is used for the first time).

Figure 2:
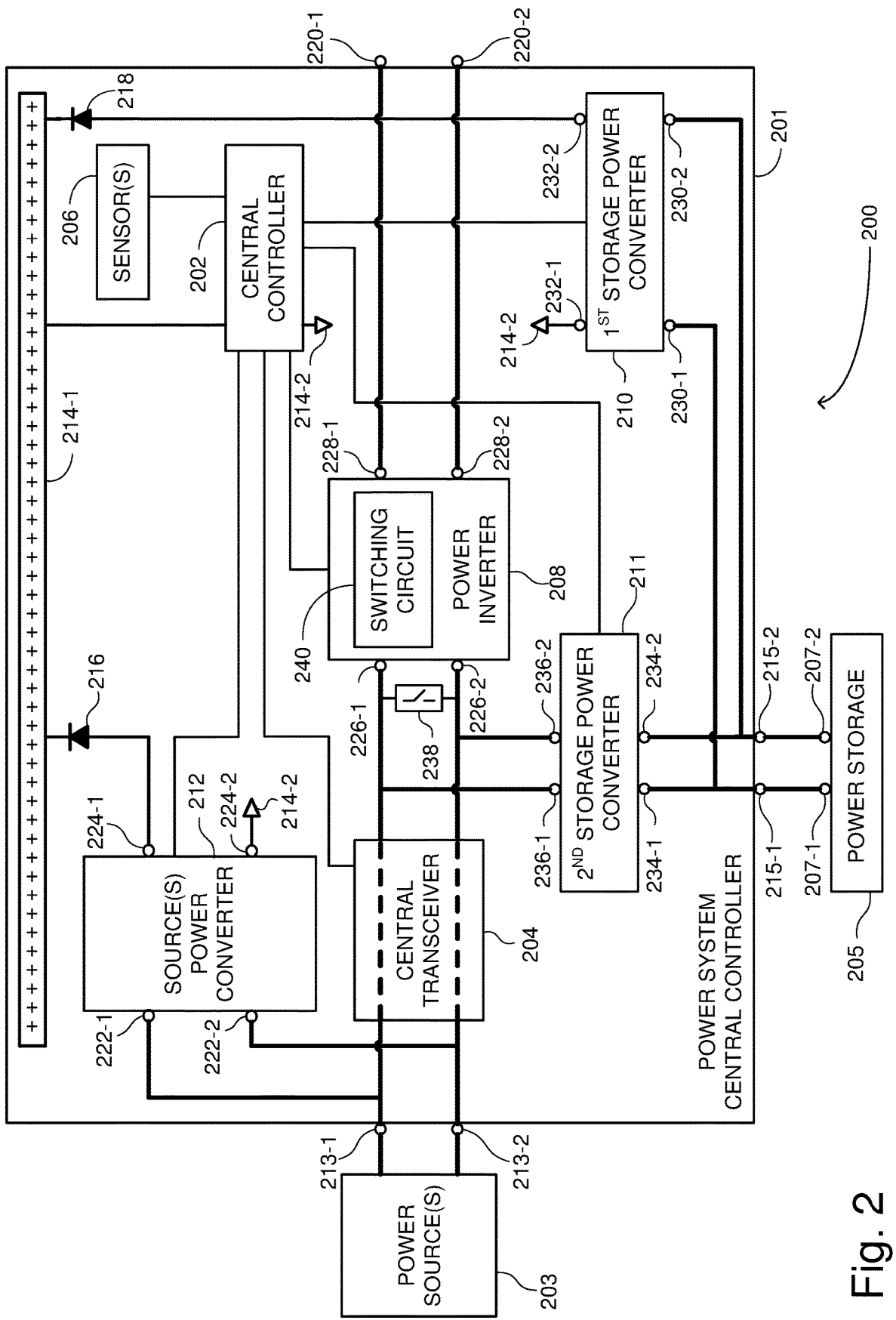
FIG. 2 shows an example of a power system.

Reference is made to FIG. 2, which shows an example of a power system 200. The power system 200 may comprise a power system controller 201 (e.g., a power system central controller), power source(s) 203 and a power storage 205. The power system controller 201 may correspond to the power system controller 101 (as shown in FIGS. 1A and 1B). The power source(s) 203 may correspond to the array of power sources 102 (as shown in FIGS. 1A and 1B). The power storage 205 may correspond to the power storage 118 (as shown in FIGS. 1A and 1B). The power system controller 201 may comprise a central controller 202 (which may correspond to the central controller 112 as shown in FIGS. 1A and 1B), a central transceiver 204 (which may correspond to the central transceiver 114 as shown in FIGS. 1A and 1B) and sensor(s) 206 (which may correspond to the sensor(s) 116 as shown in FIGS. 1A and 1B). The power system controller 201 may further comprise a power inverter 208, a first storage power converter 210, a second storage power converter 211, a source(s) power converter 212, power input terminals 213-1 and 213-2 (which may correspond to the power input terminals 113-1 and 113-2 as shown in FIGS. 1A and 1B), and power storage terminals 215-1 and 215-2 (which may correspond to the storage power terminals 115-1 and 115-2 as shown in FIGS. 1A and 1B). The power system controller 201 may comprise a supply rail 214-1 (e.g., a positive supply rail) and a reference rail 214-2 (e.g., a negative supply rail).

The central controller 202 may be connected to the central transceiver 204, the sensor(s) 206, and the power inverter 208. The central controller 202 may also be connected to the first storage power converter 210, the second storage power converter 211, and the source(s) power converter 212. The power system controller 201 may be connected to the power source(s) 203 (e.g., the array of power sources 102 as shown in FIGS. 1A and 1B), by connecting power terminal(s) of the power source(s) 203 to the power input terminals 213-1 and 213-2.

The power input terminals 213-1 and 213-2 of the power system controller 201 may be connected to source side terminals 226-1 and 226-2 of the power inverter 208 respectively. Network side terminals 228-1 and 228-2 of the power inverter 208 may be connected to power network terminals 220-1 and 220-2 of the power system controller 201 respectively. The power input terminals 213-1 and 213-2 may be connected to input terminals 222-1 and 222-2 of the source (s) power converter 212 respectively. An output terminal 224-1 (e.g., a positive output) of the source(s) power converter 212 may be connected to the supply rail 214-1 of the power system controller 201 (e.g., via a diode 216). An output terminal 224-2 (e.g., a negative output) of the source (s) power converter 212 may be connected to the reference rail 214-2. In some examples, the input terminals 222-1 and 222-2 may be connected to the power network terminals 220-1 and 220-2, and power source(s) converter 212 may be configured to convert power from the power delivery network. For example, the power deliver network may be a power grid, and the power source(s) converter 212 may operate as an AC-DC converter.

The power system controller 201 may be connected to a power storage, such as the power storage 205, by connecting power terminals 207-1 and 207-2 of the power storage 205 to the power storage terminals 215-1 and 215-2 of the power system controller 201. For example, the power storage terminal 215-1 may be connected to the power terminal 207-1, and the power storage terminal 215-2 may be connected to the power terminal 207-2. The power storage terminals 215-1 and 215-2 may be connected to input terminals 230-1 and 230-2 of the first storage power converter 210, respectively. An output terminal 232-2 (e.g., a positive output terminal) of the first storage power converter 210 may be connected to the supply rail 214-1 of the power system controller 201 (e.g., via a diode 218). An output terminal 232-1 (e.g., a negative output terminal) of the first storage power converter 210 may be connected to the reference rail 214-2 of the power system controller 201. The power storage terminals 215-1 and 215-2 may be connected to storage side terminals 234-1 and 234-2 of the second storage power converter 211 respectively. Inverter side terminals 236-1 and 236-2 of the second storage power converter 211 may be connected to the source side terminals 226-1 and 226-2 of power inverter 208, respectively.

The power input terminal 213-1, the input terminal 221-1 of the source(s) power converter 212, the source side terminals 226-1 of the power inverter 208, and the output terminal 236-1 of the second storage power converter 211 may be connected in a single electrical node. Similarly, the power input terminal 213-2, the input terminal 221-2 of the source(s) power converter 212, the source side terminals 226-2 of the power inverter 208, and the output terminal 236-2 of the second storage power converter 211 may be connected in a single electrical node (e.g., a different electrical node). The central controller 202 may be connected to the supply rail 214-1, and to the reference rail 214-2, and may receive the power for performing operations from the supply rail 214-1 and the reference rail 214-2. The central transceiver 204, the sensor(s) 206, and the power inverter 208 may receive the power for performing operations from the central controller 202, from the supply rail 214-1 and the reference rail 214-2, or from power derived from the supply rail 214-1 and the reference rail 214-2 (e.g., as further explained in conjunction with FIGS. 4 and/or 5). The first storage power converter 210, the second storage power converter 211, and the source(s) power converter 212 may be connected to the supply rail 214-1 and the reference rail 214-2, or employ an internal power supply (e.g., bootstrap power supply) using the power from the power source(s) 203 and/or from the power storage 205.

Each one of the first storage power converter 210, the second storage power converter 211, or the source(s) power converter 212 may be a DC-DC converter (e.g., buck converter, boost converter, buck-boost converter, buck and boost converter), and may convert power based on a PWM signal from the central controller 202. The power inverter 208 may be a bidirectional inverter, which may convert power from the source side terminals 226-1 and 226-2 to power at the network side terminals 228-1 and 228-2 or vice versa. The power inverter 208 may be a DC-AC inverter and may comprise an inverter switching circuit 240 (e.g., a full bridge, a half bridge, flying capacitor, cascaded-H-bridge, Neutral Point Clamped (NPC), A-NPC, or a T-type NPC inverting circuit employing two or more conversion levels) and may convert DC power to AC power or vice versa based on a PWM signal from the central controller 202. The second storage power converter 211 may be a bidirectional converter, which may convert power from the storage side terminals 234-1 and 234-2 to power at the inverter side terminals 236-1 and 236-2 or vice versa.

The power system controller 201 may receive power from the power source(s) 203 at the power input terminals 213-1 and 213-2. The source(s) power converter 212 may convert power from the power source(s) 203, and may provide power suitable for the operation of the power system controller 201 over the supply rail 214-1 and/or the reference rail 214-2. The power inverter 208 may convert power from the power source(s) 203, and may provide power at the power network terminals 220-1 and 220-2 at ratings (e.g., voltage level, current level, frequency, harmonic distortion) suitable for use by a power delivery network (e.g., a home power network, a grid).

The power system controller 201 may produce (e.g., draw, use) power from the power storage 205. For example, the second storage power converter 211 may convert power from the power storage 205, and may provide power at the source side terminals 226-1 and 226-2 of the power inverter 208, at ratings (e.g., a required voltage level, or require current level, frequency, harmonic distortion) suitable for the power inverter 208 to produce power. The power inverter 208 may convert power from the second storage power converter 211 to power at ratings suitable for use by a power distribution network. If the power system controller 201 produces power only from the power storage 205 (e.g., during a pairing process with the power regulators 110), the first storage power converter 210 may convert power from the power storage 205, and may provide power suitable for the operation of the power system controller 201 over the supply rail 214-1 and the reference rail 214-2. In some cases, if the power system controller 201 produces power from the power source(s) 203 and from the power storage 205, either one or both of source(s) power converter 212 or first storage power converter 210 may provide power to the supply rail 214-1 and the reference rail 214-2.

The power system controller 201 may store power from a power delivery network in the power storage 205. For example, the power inverter 208 may convert power from the power delivery network at the power network terminals 220-1 and 220-2 of the power system controller 201, and may provide power at the source side terminals 226-1 and 226-2 of the power inverter 208. The second storage power converter 211 may convert the power at the inverter side terminals 236-1 and 236-2 of the second storage power converter 211, to provide power at the storage side terminals 234-1 and 234-2, at ratings suitable for storage in the power storage 205.

The power system controller 201 may store power from the power source(s) 203 in the power storage 205. For example, the second storage power converter 211 may convert the power at the power input terminals 213-1 and 213-2 to power at ratings suitable for storage in the power storage 205 at the storage side terminals 234-1 and 234-2.

The power system controller 201 may short the power input terminals 213-1 and 213-2. For example, the power system controller 201 may set up communications with the power regulators 110 by shorting and opening the power input terminals 213-1 and 213-2. The central controller 202 may perform tests on the power source(s) 203 (e.g., detecting short circuit current of the power source(s) 203). The power system controller 201 may short the power input terminals 213-1 and 213-2 by closing a switch or switches such as a switch 238. A switch or switches, such as the switch 238 may be a part of the inverter switching circuit 240 (e.g., the switches in the DC-AC converter), or a part of the central transceiver 204. The input terminals 222-1 and 222-2 of the source(s) power converter 212, the source side terminals 226-1 and 226-2 of the power inverter 208, and the inverter side terminals 236-1 and 236-2 of the power inverter 208 may also be short circuited. In such a case, or in a backup mode, the power system controller 201 may not be able to employ power from the power source(s) 203 to operate various module and circuits (e.g., the central controller 202, the central transceiver 204, the sensor(s) 206). The power system controller 201 may employ power from the power storage 205 for performing operations, at least during the set-up of communications with the power regulators 110, and/or during tests and/or during a fault of power source(s) 203. The power storage 205 may provide power to the first storage power converter 210. The first storage power converter 210 may convert power from the power storage 205 to power with ratings (e.g., voltage level, current level, frequency, harmonic distortion) suitable for the operation of the power system controller 201. The first storage power converter 210 may supply power to the supply rail 214-1 and the reference rail 214-2. The central transceiver 204 may employ power from the supply rail 214-1 and the reference rail 214-2 during the pairing process. The power inverter 208, the second storage power converter 211, and the source(s) power converter 212 may be disabled during the pairing process.

The second storage power converter 211 may include isolation (e.g., galvanic isolation, a serial switch) between the inputs and outputs. If the power input terminals 213-1 and 213-2 of the power system controller 201 are short circuited (e.g., shorting the inverter side terminals 236-1 and 236-2 of the second storage power converter 211), the storage terminals 215-1 and 215-2, and the power terminal 207-1 and 207-2 of the power storage 205 may not be shorted, reducing the probability of draining or damaging the power storage 205.

Based on the communications between the power system controller 201 and the power regulators 110 being set up, the central controller 202 may activate the source(s) power converter 212 and the power inverter 208. The first storage power converter 210, may be a DC-DC converter, and may convert power from the power source(s) 203 to power with ratings (e.g., voltage level, current level, frequency, harmonic distortion) suitable for the operation of the power system controller 201.

In FIG. 2, only a single conversion level of power from either the power storage 205 (e.g., via the first storage power converter 210), or the power source(s) 203 (e.g., via the source(s) power converter 212) to power the supply rail 214-1 and reference rail 214-2 is shown. It is noted that the power system controller 201 may comprise multiple conversion levels and corresponding supply rails. For example, the outputs terminals 232-1 and 232-2 of the first storage power converter 210 may be connected to inputs of an additional power converter, which may produce power at another voltage level at additional corresponding supply rails. The first storage power converter 210 may produce power at a first voltage level (e.g., 10 Volts) and the additional power converter may produce power at a second voltage level (e.g., of 5 Volts). The inputs of the additional power converter may alternatively be connected to the power storage terminals 215-1 and 215-2. Similarly, the outputs terminals 224-1 and 224-2 of the source(s) power converter 212 may be connected to the inputs of an additional power converter, which may produce power at another voltage level at additional corresponding supply rails. The inputs of the additional power converter may alternatively be connected to the power input terminals 213-1 and 213-2. In FIG. 2, although the second storage power converter 211 is depicted as being within the power system controller 201, this is merely an example and the second power converter 211 is not limited to locate within the power system controller 201. In some cases, a power converter, such as the second storage power converter 211 may be located in the power storage 205 (e.g., the power storage 205 may include 4 terminals such as terminals 207-1 and 207-2, and terminals 236-1 and 236-2). In some cases, the power storage 205 may be part of the power system controller 201.

Figure 3:
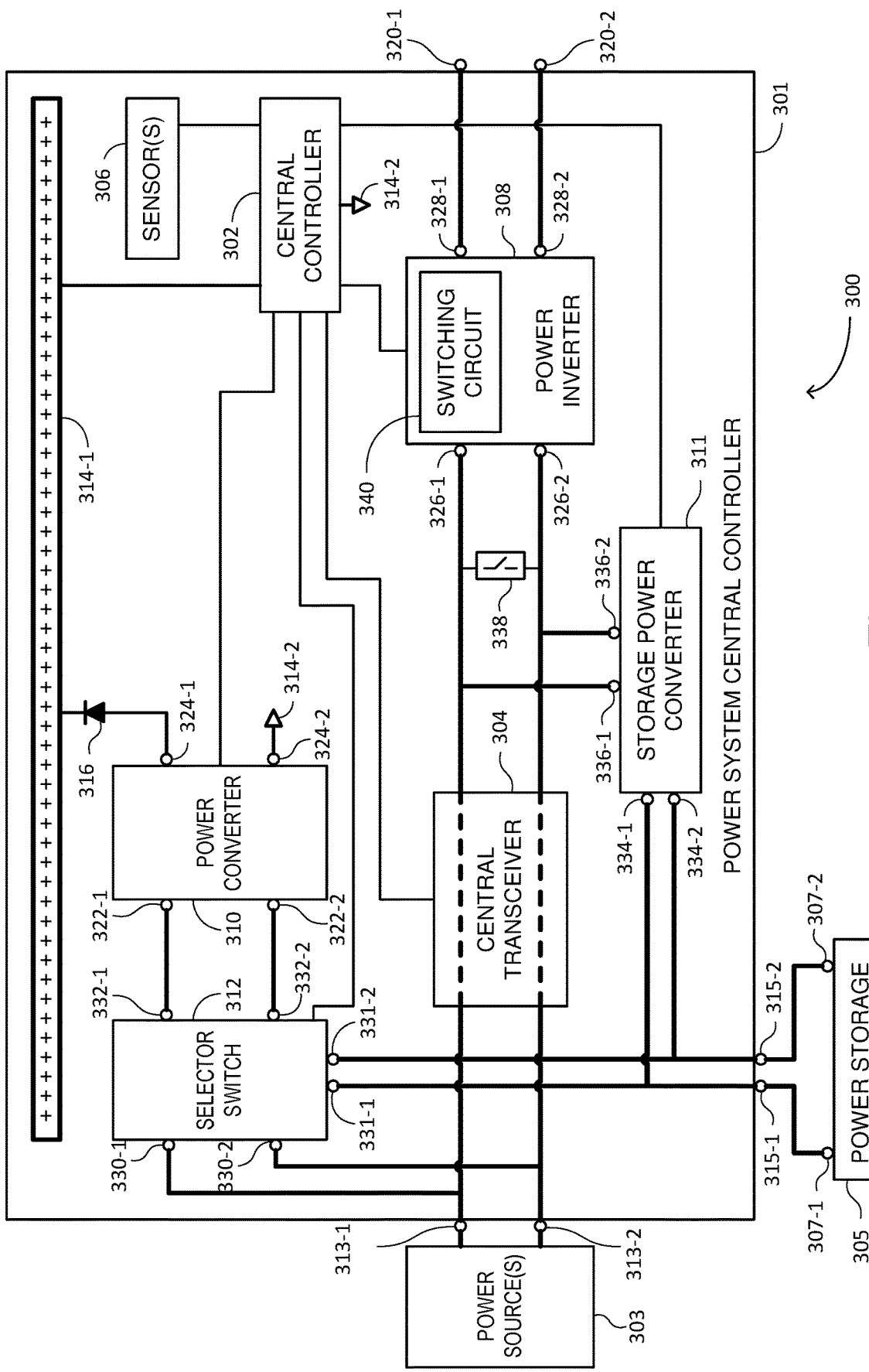
FIG. 3 shows an example of a power system.

A power system controller may include a power converter and a switch. The switch may connect the power storage to the power converter during the set-up of communication between the power system controller and power regulators, and/or during tests. The switch may connect an array of power sources to the power converter after the communications are set up. FIG. 3 shows an example illustration of a power system 300. The power system 300 may comprise a power system controller 301 (e.g., a power system central controller), power source(s) 303 and a power storage 305. The power system controller 301 may correspond to the power system controller 101 as shown in FIGS. 1A and 1B. The power source(s) 303 may correspond to the power sources 102 as shown in FIGS. 1A and 1B. The power storage 305 may correspond to the power storage 118 as shown in FIGS. 1A and 1B. The power system controller 301 may comprise a central controller 302 (which may correspond to the central controller 112 as shown in FIGS. 1A and 1B), a central transceiver 304 (which may correspond to the central controller 114 as shown in FIGS. 1A and 1B) and sensor(s) 306 (which may correspond to the sensor (s) 116 as shown in FIGS. 1A and 1B). The power system controller 301 may comprise a power inverter 308, a power converter 310, a storage power converter 311, a selector switch 312, power input terminals 313-1 and 313-2 (which may correspond to the power input terminals 113-1 and 113-2 as shown FIGS. 1A and 1B), and power storage terminals 315-1 and 315-2 (which may correspond to the storage power terminals 115-1 and 115-2 as shown in FIGS. 1A and 1B). The power system controller 301 may further comprise a supply rail 314-1 (e.g., a positive suppl rail) and a reference rail 314-2 (e.g., a negative supply rail).

The central controller 302 may be connected to the central transceiver 304, the sensor(s) 306, and the power inverter 308. The central controller 302 may be connected to the power converter 310, the storage power converter 311, and the selector switch 312. The power system controller 301 may be connected to the power source(s) 303 (e.g., the array of power sources 102 as shown in FIGS. 1A and 1B) by connecting power terminals of the array of power sources 303 to power input terminals 313-1 and 313-2. The power system controller 301 may be connected to the power storage 305 by connecting the power storage terminal 315-1 to a power terminal 307-1, and the power storage terminal 315-2 to a power terminal 307-2.

The power input terminals 313-1 and 313-2 may be connected to first input terminals 330-1 and 330-2 of the selector switch 312. The power input terminals 313-1 and 313-2 may be connected to source side terminals 326-1 and 326-2 of the power inverter 308. Output terminals 332-1 and 332-2 of the selector switch 312 may be connected to input terminals 322-1 and 322-2 of the power converter 310. A first output terminals 324-1 (e.g., a positive output terminal) of the power converter 310 may be connected to the supply rail 314-1. A second output terminals 324-1 (e.g., a negative output terminal) of the power converter 310 may be connected to the reference rail 314-2. In some examples, input terminals 330-1 and 330-2 may be connected to power network terminals 320-1 and 320-2, and power source(s) converter 312 may be configured to convert power from the power delivery network.

The power storage terminals 315-1 and 315-2 may be connected to second input terminals 331-1 and 331-2 of the selector switch 312 respectively. The power storage terminals 315-1 and 315-2 may be connected to input terminals 334-1 and 334-2 of the storage power converter 311 respectively. Output terminals 336-1 and 336-2 of the storage power converter 311 may be connected to source side terminals 326-1 and 326-2 respectively of the power inverter 308. Network side terminals 328-1 and 328-2 of the power inverter 308 may be connected to power network terminals 320-1 and 320-2 of the power system controller 301 respectively.

The power input terminal 313-1, the input terminal 330-1 of the selector switch 312, the source side terminal 326-1 of the power inverter 308, and the output terminal 336-1 of the storage power converter 311 may be connected in a single electrical node. Similarly, the power input terminal 313-2, the input terminal 330-2 of the selector switch 312, the source side terminal 326-2 of the power inverter 308, and the output terminal 336-2 of the storage power converter 311 may be connected in a single electrical node (e.g., a different electrical node). The central controller 302 may be connected to the supply rail 314-1 and the reference rail 314-2, and may receive the power for performing operations from the supply rail 314-1 and the reference rail 314-2. The central transceiver 304, the sensor(s) 306, and the power inverter 308 may receive the power for performing operations from the central controller 302, from the supply rail 314-1 and the reference rail 314-2, or from power derived from the supply rail 314-1 and the reference rail 314-2 (e.g., as further explained in conjunction with FIGS. 4 and/or 5). The power converter 310, the storage power converter 311, and the selector switch 312 may also be connected to the supply rail 314-1 and the reference rail 314-2, or employ an internal power supply (e.g., bootstrap power supply) using the power from the power source(s) 303 or from the power storage 305.

Each one of the power converter 310, the storage power converter 311, may be a DC-DC converter (e.g., buck converter, boost converter, buck-boost converter, buck and boost converter), and may convert power based on a PWM signal from the central controller 302. The power inverter 308 may be a bidirectional inverter, which may convert power from the source side terminals 326-1 and 326-2 to power at the network side terminals 328-1 and 328-2 or vice versa. The power inverter 308 may be a DC-AC inverter and may comprise an inverter switching circuit 340 (e.g., a full bridge, a half bridge, flying capacitor, cascaded-H-bridge, Neutral Point Clamped (NPC) inverter, A-NPC inverter, or a T-type NPC inverting circuit employing two or more conversion levels) and may convert DC power to AC power or vice versa based on a PWM signal from the central controller 302. The storage power converter 311 may be a bidirectional converter, which may convert power from the storage side terminals 334-1 and 334-2 to power at the inverter side terminals 336-1 and 336-2 or vice versa.

The power system controller 301 may produce power from the power source(s) 303. For example, the central controller 302 may control the selector switch 312 to connect the power input terminals 313-1 and 313-2 to the input terminals 322-1 and 322-2 of the power converter 310 respectively. The power converter 310 may provide power suitable for the operation of the power system controller 301 over the supply rail 314-1 and the reference rail 314-2. The power inverter 308 may convert power from the power source(s) 303, and may provide power at the power network terminals 320-1 and 320-2 at ratings suitable for use by a power distribution network.

The power system controller 301 may produce power from the power storage 305. For example, the storage power converter 311 may convert power from the power storage 305, and may provide power at the source side terminals 326-1 and 326-2 of the power inverter 308, at ratings suitable for the power inverter 308 to produce power. The power inverter 308 may convert power from the storage power converter 311 to power at ratings suitable for use by a power distribution network. If the power system controller 301 produces power only from the power storage 305 (e.g., during a pairing process with the power regulators 110), the central controller 302 may control the selector switch 312 to connect the power storage terminals 315-1 and 315-2 to the input terminals 322-1 and 322-2 of power converter 310 respectively. The power converter 310 may convert power from the power storage 305, and may provide power suitable for the operation of the power system controller 301 over the supply rail 314-1 and the reference rail 314-2. The power system controller 301 may produce power from the power source(s) 303 and from the power storage 305. The central controller 302 may control the selector switch 312 to connect either the power input terminals 313-1 and 313-2, or the storage terminals 315-1 and 315-2, to the power converter 310.

The power system controller 301 may store power from a power delivery network in the power storage 305. The power inverter 308 may convert power from the power delivery network at the power network terminals 320-1 and 320-2 of the power system controller 301, and may provide power at the source side terminals 326-1 and 326-2 of the power inverter 308. The storage power converter 311 may convert the power at the inverter side terminals 336-1 and 336-2 to power at the storage side terminals 334-1 and 334-2, at ratings suitable for storage in the power storage 305.

The power system controller 301 may store power from the power source(s) 303 in the power storage 305. The storage power converter 311 may convert the power at the power input terminals 313-1 and 313-2 to power at ratings suitable for storage in the power storage 305 at the storage side terminals 334-1 and 334-2.

The power system controller 301 may short the power input terminals 313-1 and 313-2. For example, the power system controller 301 may set up communications with the power regulators 110 by shorting and opening the power input terminals 313-1 and 313-2. The central controller 302 may perform tests on the power source(s) 303 (e.g., detecting short circuit current of the power source(s) 303). The power system controller 301 may short power input terminals 313-1 and 313-2 by closing a switch or switches such as a switch 338. A switch or switches, such as the switch 338 may be a part of the inverter switching circuit 340 (e.g., the switches in the DC-AC converter), or a part of the central transceiver 304. The source side terminals 326-1 and 326-2 of the power inverter 308, and the inverter side terminals 336-1 and 336-2 of the storage power converter 311, or the input terminals 330-1 and 330-2 of the selector switch 312 may also be short circuited. In such a case, or in a backup mode, the power system controller 301 may not be able to employ power from the power source(s) 303 to operate various module and circuits (e.g., the central controller 302, the central transceiver 304, or the sensor(s) 306). The power system controller 301 may employ power from the power storage 305 for performing operations, at least during the set-up of communications with the power regulators 110 and/or during tests and/or during a fault. Prior to shorting the power input terminals 313-1 and 313-2, the central controller 302 may control the selector switch 312 to connect the power storage terminals 315-1 and 315-2 to the input terminals 322-1 and 322-2 of the power converter 310 respectively. The power storage 305 may provide power to the power converter 310. The power converter 310, may be a DC-DC converter (e.g., buck converter, boost converter, buck-boost converter, buck and boost converter), and may convert power from the power storage 305 to power with ratings suitable for the operation of the power system controller 301. The power converter 310 may supply the output power to the supply rail 314-1 and the reference rail 314-2. The central transceiver 304 may employ power from the supply rail 314-1 and the reference rail 314-2 during the pairing process. The power inverter 308 and the storage power converter 311 may be disabled during the pairing process.

The storage power converter 311 may include isolation (e.g., galvanic isolation, a serial switch) between the inputs and outputs thereof. If the power input terminals 313-1 and 313-2 of the power system controller 301 are short circuited (e.g., shorting the outputs of the storage power converter 311), the storage terminals 315-1 and 315-2, and the power terminal 307-1 and 307-2 of the power storage 305 may not be shorted, reducing the probability of draining or damaging the power storage 305.

In FIG. 3, only a single conversion level of power from either the power storage 305 (e.g., via the storage power converter 311), or the power source(s) 303 (e.g., via the storage power converter 311) to power on the supply rail 314-1 and the reference rail 314-2 is shown. It is noted that the power system controller 307 may comprise multiple conversion levels and corresponding supply rails. For example, the output terminals 324-1 and 324-2 of the power converter 310 may be connected to inputs of an additional power converter, which may produce power at another voltage level at additional corresponding supply rails. For example, the power converter 310 may produce power at a first voltage level (e.g., 10 Volts) and the additional power converter may produce power at a second voltage level (e.g., 5 Volts). The inputs of the additional power converter may alternatively be connected to the power storage terminals 315-1 and 315-2. The inputs of the additional power converter may alternatively be connected to the power input terminals 313-1 and 313-2. In FIG. 3, although the storage power converter 311 is depicted as being within the power system controller 301, this is merely an example and the storage power converter 311 is not limited to locate within the power system controller 301. In some cases, a power converter, such as the power converted 311 may be located in the power storage 305 (e.g., the power storage 305 may include 4 terminals such as terminals 307-1 and 307-2, and 336-1 and 336-2). In some cases, the power storage 305 may be part of the power system controller 301.

As described above, at least one of the power system controller 201 (FIG. 2) or the power system controller 301 (FIG. 3) may have multiple power conversion stages for supplying power employed for the operation of the power system controller. FIG. 4 shows an example of a power supply system 400. The power supply system 400 may comprise multiple conversion stages. The power supply system 400 may comprise a power source 402, a first power converter 404, and a second power converter 406. The power supply system 400 may comprise a plurality of modules that require power (e.g., a first module 408, a second module 410, a third module 412, a fourth module 414). It is noted that the four modules are described herein as an example only. A power system may include more or less than four modules. The power system 400 may comprise a plurality of pairs of supply rails (e.g., first pair of supply rails 416-1 and 416-2, second pair of supply rails 418-1 and 418-2).

The first module 408 and the second module 410 may be connected between the first pair of supply rails 416-1 and 416-2. The third module 412 and the fourth module 414 may be connected between the second pair of supply rails 418-1 and 418-2. The outputs of the power source 402 may be connected to the inputs of the first power converter 404. The outputs of the first power converter 404 may be connected to the second pair of supply rails 418-1 and 418-2, and to the inputs of the second power converter 406. The outputs of the second power converter 406 may be connected to the first pair of supply rails 416-1 and 416-2.

The first power converter 404 may convert power from the power source 402 and output power at a first rating level (e.g., a first voltage level, or a first current level). For example, the first power converter 404 may output power at a voltage level of 12V. The third module 412 and the fourth module 414 may operate at the first rating level. For example, the third module 412 may be gate drivers of switches in a power inverter (e.g., the power inverter 208 as shown in FIG. 2, the power inverter 308 as shown in FIG. 3) and the fourth module 414 may be cooling fans. The second power converter 406 may convert the power from the first power converter 404 and may output power at a second rating level. For example, the first power converter 404 may output power at a voltage level of 5V. The first module 408 and the second module 410 may operate at the second rating level. For example, the first module 408 may be a controller (e.g., the central controller 202 as shown in FIG. 2, or the central controller 302 as shown in FIG. 3), and the second module 410 may be a transceiver (e.g., the central transceiver 204 as shown in FIG. 2, the central transceiver 304 as shown in FIG. 3).

FIG. 5 shows a power supply system 500. The power supply system 500 may comprise multiple conversion stages. The power supply system 500 may comprise a power source 502, a first power convertor 504, and a second power converter 506. The power supply system 500 may comprise a plurality of modules that require power (e.g., a first module 508, a second module 510, a third module 512, a fourth module 514). It is noted that four modules are described herein as an example only. A power system may include more or less than four modules. The power system 500 may comprise a plurality of pairs of supply rails (e.g., first pair of supply rails 516-1 and 516-2, second pair of supply rails 518-1 and 518-2).

The first module 508 and the second module 510 may be connected between the first pair of supply rails 516-1 and 516-2. The third module 512 and the fourth module 514 may be connected between the second pair of supply rails 518-1 and 518-2. The outputs of the power source 502 may be connected to the inputs of the first power converter 504, and to the inputs of the second power converter 506. The outputs of the first power converter 504 may be connected to the second pair of supply rails 518-1 and 518-2. The outputs of the second power converter 506 may be connected to the first pair of supply rails 516-1 and 516-2.

The first power converter 504 may convert power from the power source 502 and may output power at a first rating level (e.g., a first voltage level, or a first current level). The first module 508 and the second module 510 may operate at the first rating level. The second power converter 506 may convert power from the power source 502, and may output power at a second rating level. The third module 512 and the fourth module 514 may operate at the second rating level.

The examples in FIGS. 4 and 5 illustrate a dual rail power supply (e.g., employing two rating levels) using or based on two conversion stages. The power supply system 400 or the power supply system 500 may be a multiple-rail power supply (e.g., employing a plurality of rating levels) using or based on multiple conversion stages. In the example of FIG. 4 above, the multiple conversion stages are arranged in a serial arrangement (e.g., one following the other). In the example of FIG. 5, the multiple conversion stages are arranged in a parallel arrangement (e.g., one in parallel with the other). It is noted that a power system employing multiple conversion stages may employ a combination of series and parallel arrangement. For example, inputs of a first conversion stage may be connected to a power supply. The outputs of the first conversion stage may be connected to the inputs of a second conversion stage. The inputs of a third conversion stage may be connected to a power supply and the inputs of a fourth conversion stage may be connected to the outputs of the first conversion stage.

Figure 6:
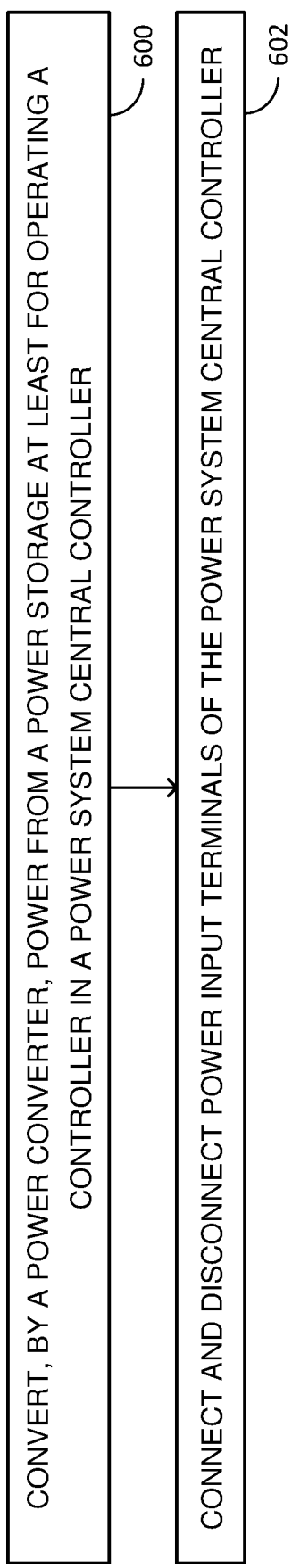
FIG. 6 shows an example of a method.

FIG. 6 shows an example of a method. In step 600, power from a power storage may be converted by a power converter to operate a least a controller in a power system controller (e.g., a power system central controller). For example, as shown in FIG. 2, the first storage power converter 210 may convert power from the power storage 205 at least for operating the central controller 202. As another example, as shown in FIG. 3, the power converter 310 may convert power from the power storage 305 at least for operating the central controller 302.

In step 602, power input terminals of the power system controller may be connected and disconnected (e.g., alternately). For example, as shown in FIG. 2, the central controller 202 may control the switch 238 to connect and disconnect power input terminals 213-1 and 213-2 alternately. As another example, as shown in FIG. 3, the central controller 302 may control the switch 338 to connect and disconnect power input terminals 313-1 and 313-2 alternately. Connecting and disconnecting power input terminals of the power system controller may be employed for signaling power regulators connected to the power input terminals of the power system controller. For example, a "0" may be determined (e.g., measured, sent) when the power input terminals are connected (e.g., shorted). A "1" may be determined (e.g., measured, sent) when the power input terminals are open. For example, during the communications set-up process between the power system controller and the power regulators, the power system controller may signal to the power regulators information relating to an identification (ID) of the power system controller, and/or at least one communication frequency for communications between the power system controller and the power regulators by connecting and disconnecting the power input terminals of the power system controller. For example, connecting and disconnecting power input terminals of the power system controller may be employed during system measurements (e.g., short current measurements).

Figure 7:
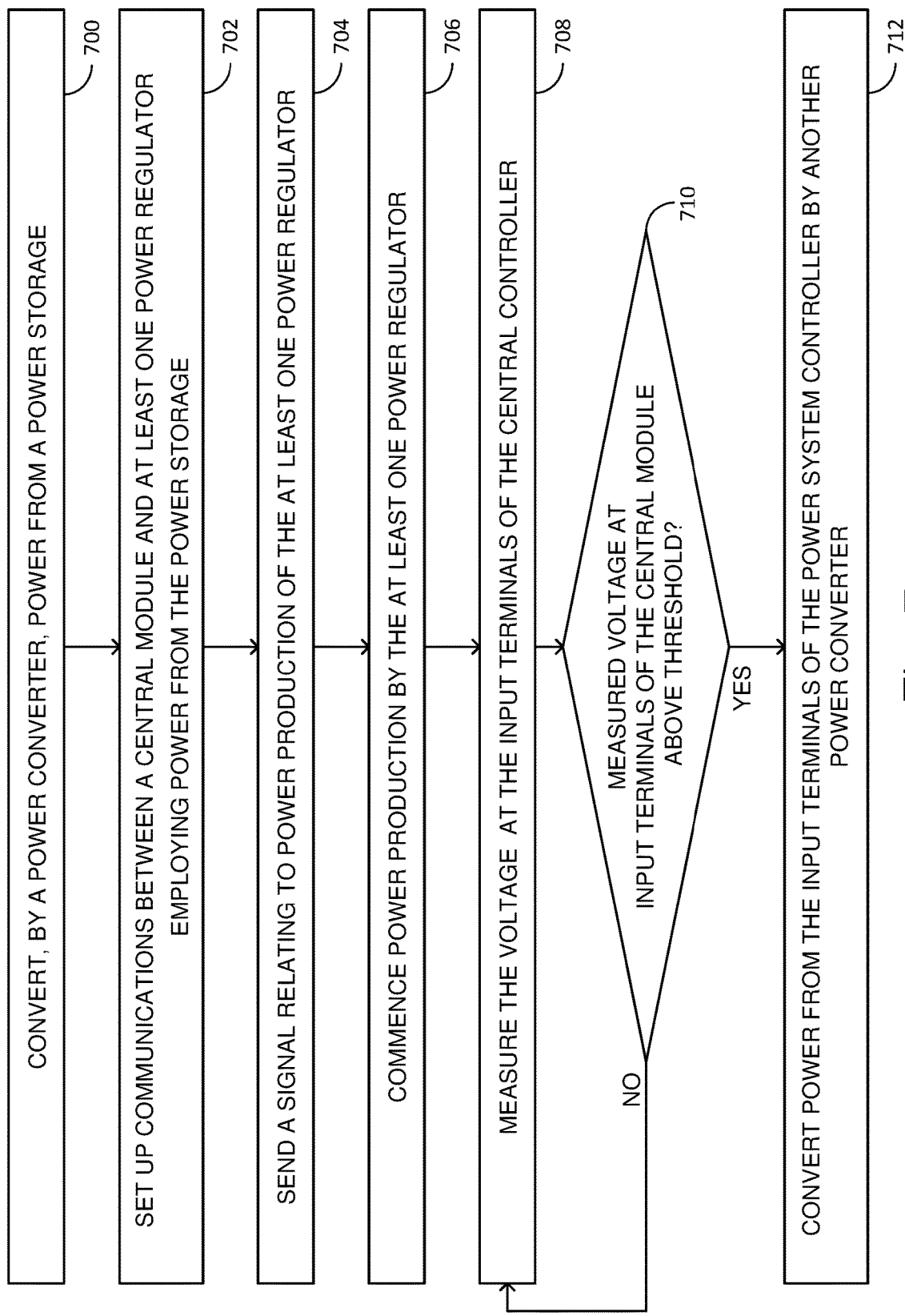
FIG. 7 shows an example of a method for setting up communications.

FIG. 7 shows an example of a method for setting up communications. In step 700, power from a power storage may be converted by a power converter. For example, as shown in FIG. 2, the first storage power converter 210 may convert power from the power storage 205. As another example, as shown in FIG. 3, the power converter 310 may convert power from the power storage 305.

In step 702, communications between a power system controller (e.g., a power system central controller) and at least one power regulator may be set up employing power from a power storage. The communications between the power system controller and the at least one power regulator may be set up by shorting and opening the power lines connecting the at least one power regulator with the power system controller. For example, as shown in FIGS. 1A-1C, the central transceiver 114 may set up communications between the power system controller 101 and the power regulators 110. As another example, as shown in FIG. 2, the central transceiver 204 may set up communications between the power system controller 200 and the power regulators 110 in the array of power sources 102. As another example, as shown in FIG. 3, the central transceiver 304 may set up communications between the power system controller 301 and the power regulators 110 in the array of power sources 102.

In step 704, a signal relating to power production of the at least one power regulator is sent. For example, based on (e.g., after) the communications between the power system controller and the at least one power regulator being set-up, the power system controller may send one or more signals relating to power production of the at least one power regulators. This signal relating to the power production of the at least one power regulator may comprise indications and/or information relating to increasing, decreasing, or maintaining an output characteristic (e.g., output power, output voltage, or output current) of the at least one power regulator. For example, as shown in FIGS. 1A-1C, based on the communications between the power system controller 101 and the power regulators 110 being set up, the central transceiver 114 of the power system controller 101 may send one or more signals relating to power production of the power regulators 110.

In step 706, power production may commence by the at least one power regulator. For example, the at least one regulator may produce power based on the received signal relating to power production. For example, as shown in FIGS. 1A-1C, the power regulators 110 may produce power based on the received the signal relating to power production.

In step 708, the voltage at the input terminals of the power system controller may be determined (e.g., measured, sensed). For example, as shown in FIGS. 1A-1B, the sensor(s) 116 may measure the voltage at the power input terminals 113-1 and 113-2 of the power system controller 101. As another example, as shown in FIGS. 2, the sensor(s) 206 may measure the voltage at the power input terminals 213-1 and 213-2 of the power system controller 201. As another example, as shown in FIGS. 3, the sensor(s) 306 may measure the voltage at the power input terminals 313-1 and 313-2 of the power system controller 301.

In step 710, the voltage at the input terminals of the power system controller may be compared to a threshold (e.g., 300V, 350V, 400V, 450V, 600V, 800V). Based on a determination that the voltage at the input terminals of the power system controller is above the threshold, the method may proceed to step 712. Based on a determination that the voltage at the input terminals of the power system controller is not above the threshold (e.g., below the threshold), the method may return to step 708. For example, with reference to FIGS. 1A-1B, the central controller 112 may compare the voltage at power input terminals 113-1 and 113-2 to a threshold. As another example, with reference to FIG. 2, the central controller 202 may compare the voltage at the power input terminals 213-1 and 213-2 to a threshold. As another example, with reference to FIG. 3, the central controller 302 may compare the voltage at the power input terminals 313-1 and 313-2 to a threshold.

In step 712, based on a determination that the voltage at the input terminals of the power system controller is above the threshold, power received from the at least one power regulator may be converted by the power converter or by another power converter to power (e.g., to 12V, 10V, 5V, 3V) used for the operation of the power system controller. For example, with reference to FIG. 2, based on a determination that the voltage at the power input terminals 213-1 and 213-2 is above the threshold, the source(s) power converter 212 may convert the power from the power input terminals 213-1 and 213-2 of the power system controller 201 to power used for the operation of the power system controller 201. For example, with reference to FIG. 3, based on a determination that the voltage at the power input terminals 313-1 and 313-2 is above the threshold, the power converter 310 may convert power from the power input terminals 313-1 and 313-2 of the power system controller 301 to power used for the operation of the power system controller 301.

One or more aspects of the application may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the application, and such data structures are contemplated within the scope of computer executable instructions and computer-usable data described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
a power system controller comprising:
a first pair of power terminals;
a second pair of power terminals coupled to a power source;
a power supply rail;
at least one switch coupled between the second pair of terminals;
a controller coupled to the at least one switch, wherein the controller is configured to control the at least one switch to connect and disconnect the second pair of power terminals to and from each other, respectively; and
a power converter comprising first input terminals and first output terminals,
wherein the first input terminals are coupled to the first pair of power terminals and the first output terminals are connected to the power supply rail; and
a power storage connected to the first pair of power terminals of the power system controller,
wherein the power converter is configured to convert power from the power storage to a voltage level, to supply power to the power supply rail, and
wherein the power system controller is configured to receive power from the power storage at the voltage level, during a process of connecting and disconnecting the second pair of power terminals.

2. The system of claim 1, wherein the power system controller further comprises a power inverter,
wherein input terminals of the power inverter are coupled to the second pair of power terminals, and
wherein the power inverter is configured to convert DC power at the input terminals of the power inverter to AC power at output terminals of the power inverter.

3. The system of claim 1, wherein the power converter is one of a buck converter, a boost converter, a buck-boost converter, or a buck-and-boost converter.

4. The system of claim 1, wherein the power system controller further comprises a second power converter, the second power converter comprising second input terminals and second output terminals,
wherein the second input terminals of the second power converter are coupled to the second pair of power terminals of the power system controller,
wherein the second output terminals of the second power converter are connected to the power supply rail of the power system controller, and
wherein the second power converter is configured to convert power from the power source, and to provide power to the power system controller.

5. The system of claim 4, wherein the second power converter is one of a buck converter, a boost converter, a buck-boost converter, or a buck-and-boost converter.

6. The system of claim 2, wherein the power system controller further comprises a third power converter, the third power converter comprising storage side terminals and inverter side terminals,
wherein the storage side terminals of the third power converter are coupled to the first pair of power terminals and the inverter side terminals of the third power converter are connected to the input terminals of the power inverter, and
wherein the third power converter is an isolated power converter galvanically isolating the storage side terminals from the inverter side terminals.

7. The system of claim 6, wherein the third power converter is one of a buck converter, a boost converter, a buck-boost converter, or a buck-and-boost converter.

8. The system of claim 1, further comprising a plurality of power regulators,
wherein each of the plurality of power regulators comprises:
input terminals coupled to a respective power source;
output terminals; and
a regulator transceiver,
wherein the output terminals of the plurality of power regulators are coupled in a string, and
wherein the string is connected to the second pair of power terminals.

9. The system of claim 8, wherein the power system controller comprises a central transceiver, and wherein the central transceiver and the regulator transceiver of each of the plurality of power regulators are configured to communicate with each other over power lines.

10. The system of claim 9, wherein the power system controller is configured to set up communications between the central transceiver and a regulator transceiver of a respective one of the plurality of power regulators by controlling the at least one switch to connect and disconnect the second pair of power terminals.

11. The system of claim 1, wherein the power source comprises at least one of:
- a photovoltaic module;
- a battery;
- a supercapacitor;
- a flywheel;
- a wind turbine;
- a power generator; or
- a fuel cell.

12. The system of claim 1, wherein the power storage comprises at least one of:
- a battery;
- a flywheel; or
- a supercapacitor.

13. The system of claim 1, wherein the power storage is configured to at least one of:
- provide power to the power system controller, or
- store power received from the power system controller.

14. A method comprising:
- converting, by a power converter, power from a power storage;
- setting up communications between a power system controller and at least one power regulator employing power from the power storage; and
- commencing power production by the at least one power regulator,
- wherein the setting up communications between the power system controller and the at least one power regulator comprises sending a communications set-up signal by connecting and disconnecting a pair of power terminals of the power system controller;
- wherein the pair of power terminals is coupled between the at least one power regulator and the power system controller; and
- wherein the at least one power regulator is connected to a power source.

15. The method of claim 14, wherein the commencing power production by the at least one power regulator is based on a signal relating to power production, wherein the signal is sent by a power system central transceiver in the power system controller.

16. The method of claim 14, further comprising:
- determining a voltage at input terminals of the power system controller; and
- based on a determination that the determined voltage is above a threshold, converting power from the input terminals of the power system controller.

17. The method of claim 14, wherein the communications set-up signal comprises information indicating an identification of the power system controller, or at least one communication frequency.

* * * * *